US010204056B2

(12) United States Patent
Henry et al.

(10) Patent No.: US 10,204,056 B2
(45) Date of Patent: Feb. 12, 2019

(54) DYNAMIC CACHE ENLARGING BY COUNTING EVICTIONS

(71) Applicant: VIA TECHNOLOGIES, INC., New Taipei (TW)

(72) Inventors: G. Glenn Henry, Austin, TX (US); Stephan Gaskins, Austin, TX (US)

(73) Assignee: VIA ALLIANCE SEMICONDUCTOR CO., LTD, Shanghai (CN)

(*) Notice: Subject to any disclaimer, the term of this patent is extended or adjusted under 35 U.S.C. 154(b) by 620 days.

(21) Appl. No.: 14/188,905

(22) Filed: Feb. 25, 2014

(65) Prior Publication Data

US 2015/0212947 A1 Jul. 30, 2015

Related U.S. Application Data

(60) Provisional application No. 61/932,135, filed on Jan. 27, 2014.

(51) Int. Cl.
*G06F 12/0891* (2016.01)
*G06F 12/0842* (2016.01)
(Continued)

(52) U.S. Cl.
CPC ........ *G06F 12/0891* (2013.01); *G06F 1/3203* (2013.01); *G06F 1/3215* (2013.01); *G06F 1/3243* (2013.01); *G06F 1/3287* (2013.01); *G06F 9/50* (2013.01); *G06F 12/0842* (2013.01); *G06F 12/0864* (2013.01); *G06F 12/0893* (2013.01); G06F 2212/6082 (2013.01); Y02D 10/152 (2018.01); Y02D 50/20 (2018.01)

(58) Field of Classification Search
CPC ............. G06F 12/0864; G06F 12/0842; G06F 12/0893; G06F 1/3203; G06F 1/3287; G06F 1/3215
See application file for complete search history.

(56) References Cited

U.S. PATENT DOCUMENTS 6,865,647 B2 * 3/2005 Olarig ..................... G06F 12/12
711/129
7,694,075 B1 * 4/2010 Feekes, Jr. .......... G06F 12/0888
711/119

(Continued)

*Primary Examiner* — Jaweed A Abbaszadeh
*Assistant Examiner* — Gayathri Sampath
(74) *Attorney, Agent, or Firm* — McClure, Qualey & Rodack, LLP

(57) ABSTRACT

A microprocessor includes a cache memory and a control module. The control module makes the cache size zero and subsequently make it between zero and a full size of the cache, counts a number of evictions from the cache after making the size between zero and full and increase the size when the number of evictions reaches a predetermined number of evictions. Alternatively, a microprocessor includes: multiple cores, each having a first cache memory; a second cache memory shared by the cores; and a control module. The control module puts all the cores to sleep and makes the second cache size zero and receives a command to wakeup one of the cores. The control module counts a number of evictions from the first cache of the awakened core after receiving the command and makes the second cache size non-zero when the number of evictions reaches a predetermined number of evictions.

18 Claims, 4 Drawing Sheets

(51) Int. Cl.
*G06F 1/32* (2006.01)
*G06F 12/0864* (2016.01)
*G06F 12/0893* (2016.01)
*G06F 9/50* (2006.01)

(56) References Cited

U.S. PATENT DOCUMENTS

| | | | |
|---|---|---|---|
| 2003/0084248 A1* | 5/2003 | Gaither | G06F 12/0804 |
| | | | 711/133 |
| 2008/0059707 A1* | 3/2008 | Makineni | G06F 12/0897 |
| | | | 711/122 |
| 2008/0307423 A1 | 12/2008 | Karlapalem | |
| 2012/0159074 A1* | 6/2012 | Sodhi | G06F 12/0895 |
| | | | 711/122 |
| 2012/0173907 A1 | 7/2012 | Moses et al. | |
| 2012/0331321 A1 | 12/2012 | Kaburlasos et al. | |
| 2013/0036270 A1* | 2/2013 | Dreslinski | G06F 12/0893 |
| | | | 711/128 |
| 2014/0181410 A1* | 6/2014 | Kalamatianos | G06F 12/121 |
| | | | 711/133 |
| 2014/0195733 A1* | 7/2014 | Russell | G11C 11/4125 |
| | | | 711/114 |
| 2015/0067264 A1* | 3/2015 | Eckert | G06F 12/126 |
| | | | 711/133 |

* cited by examiner

DYNAMIC CACHE ENLARGING BY COUNTING EVICTIONS

CROSS REFERENCE TO RELATED APPLICATION(S)

This application claims priority based on U.S. Provisional Application Ser. No. 61/932,135, filed Jan. 27, 2014, entitled DYNAMIC CACHE ENLARGING BY COUNTING EVICTIONS, which is hereby incorporated by reference in its entirety.

BACKGROUND

Serious attention has been given to the amount of power consumed by microprocessors. A large amount of the power budget of contemporary microprocessors is consumed by their cache memories. Therefore, what is needed is a way to reduce the cache memory power consumption.

BRIEF SUMMARY

In one aspect the present invention provides a microprocessor. The microprocessor includes a cache memory and a control module. The control module is configured to make a size of the cache memory zero and subsequently make the size of the cache memory between zero and a full size of the cache memory, count a number of evictions from the cache memory after making the size of the cache memory between zero and a full size of the cache memory and increase the size of the cache memory when the number of evictions reaches a predetermined number of evictions.

In another aspect, the present invention provides a method for managing performance and power consumption by a microprocessor having a cache memory capable of having its size dynamically varied during operation of the microprocessor. The method includes making a size of the cache memory zero. The method also includes making the size of the cache memory between zero and a full size of the cache memory after making the size of the cache memory zero. The method also includes counting a number of evictions from the cache memory after making the size of the cache memory between zero and a full size of the cache memory. The method also includes increasing the size of the cache memory when the number of evictions reaches a predetermined number of evictions.

In yet another aspect, the present invention provides a microprocessor. The microprocessor includes a plurality of processing cores each comprising a first cache memory, a second cache memory shared by the plurality of processing cores, and a control module. The control module is configured to put all the plurality of processing cores to sleep and make a size of the second cache memory zero. The control module is also configured to receive a command to wakeup one of the cores. The control module is also configured to count a number of evictions from the first cache memory of the one of the cores after receiving the command. The control module is also configured to make the size of the second cache memory non-zero when the number of evictions reaches a predetermined number of evictions.

In yet another aspect, the present invention provides a method for managing the performance and power consumption of a microprocessor having a plurality of processing cores each having a first cache memory, the microprocessor also having a second cache memory shared by the plurality of processing cores. The method includes putting all the plurality of processing cores to sleep and making a size of the second cache memory zero. The method also includes receiving a command to wakeup one of the cores. The method also includes counting a number of evictions from the first cache memory of the one of the cores, after said receiving the command. The method also includes making the size of the second cache memory non-zero when the number of evictions reaches a predetermined number of evictions.

DETAILED DESCRIPTION OF THE EMBODIMENTS

Figure 1:
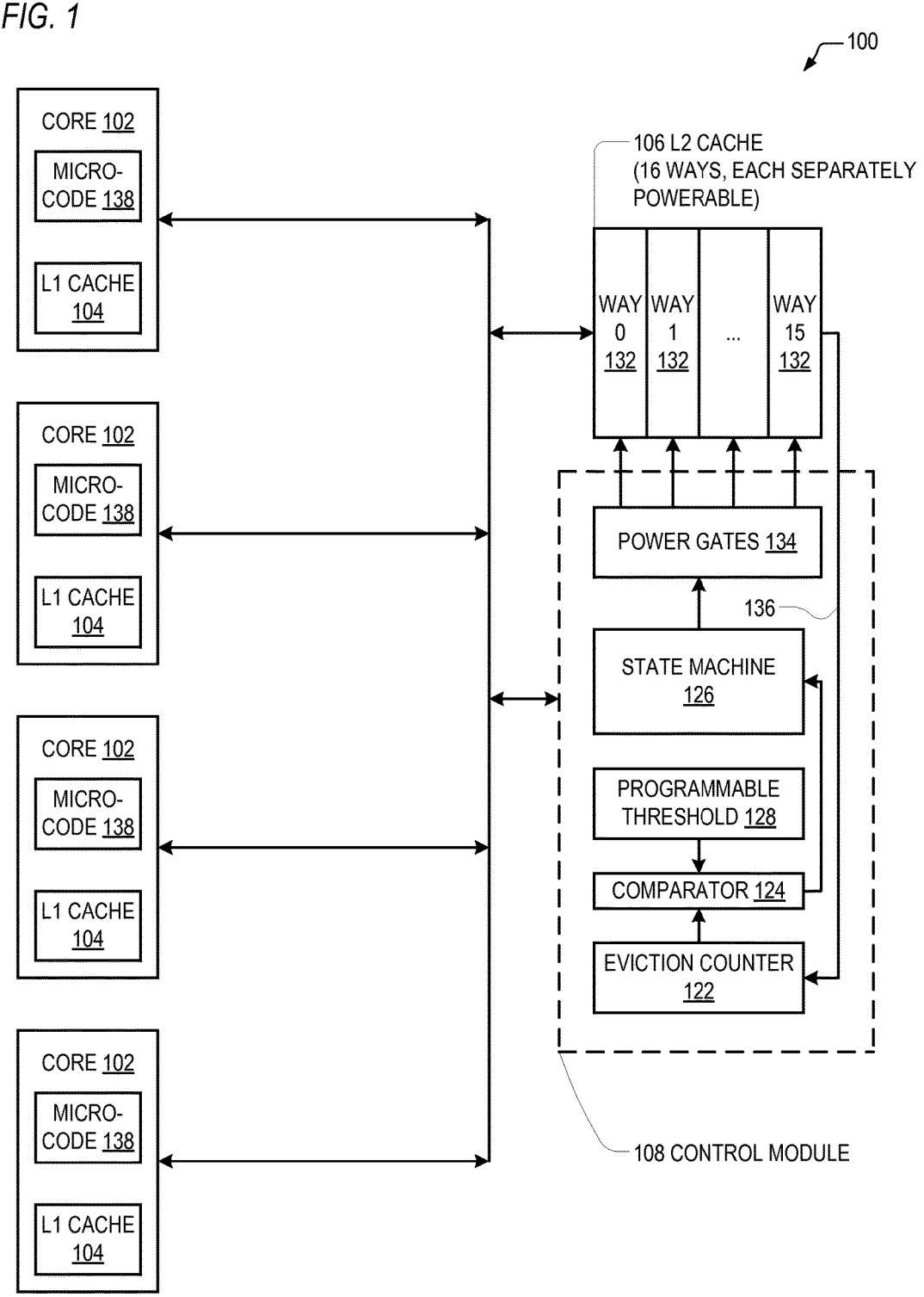
FIG. 1 is a block diagram of an embodiment of a microprocessor.

Referring now to FIG. 1, a block diagram of an embodiment of a microprocessor 100 is shown. The microprocessor 100 includes a plurality of processing cores 102, a level-2 (L2) cache memory 106 coupled to the cores 102, and a control module 108 coupled to the cores 102 and to the L2 cache 106. FIG. 1 shows an embodiment with four cores 102; however, other embodiments are contemplated with a different number of cores 102. Furthermore, the various embodiments for dynamically enlarging a cache memory by counting evictions described herein may be applied to single core processors.

Preferably, the L2 cache 106 is a set-associative cache comprising a plurality of ways 132. The embodiment of FIG. 1 shows sixteen ways 132; however, other embodiments are contemplated with a different number of ways. The different ways are separately powerable. That is, the control module 108 is configured to individually provide or not provide power to each way of the L2 cache 106. In an alternate embodiment, groups of the ways are separately powerable. For example, in one embodiment the ways are separately powerable in groups of two ways. Advantageously, by powering up only some, or in some cases none, of the ways 132 of the L2 cache 106, power consumption may be reduced, as described herein. In the present disclosure, making the size of the L2 cache 106 zero means to remove power from all the ways 132 of the L2 cache 106, increasing the size of the L2 cache 106 means providing power to additional ways 132 of the L2 cache 106 and making them available to cache valid data, and decreasing the size of the L2 cache 106 means providing power to fewer ways 132 of the L2 cache 106 and making them unavailable to cache valid data.

The control module 108 includes power gates 134 coupled to the L2 cache 106; state machine 126 coupled to control the power gates 134; a programmable threshold register 128 and an eviction counter 122 both coupled to a comparator 124 that provides an output to the state machine 126. The eviction counter 122 receives an indication 136 from the L2 cache 106 when it evicts a cache line, which causes the eviction counter 122 to count the number of cache line evictions from the L2 cache 106. A cache line eviction, or simply eviction, occurs when the cache memory replaces a valid cache line with another cache line in response to a cache miss. If the evicted cache line contains modified data, the cache memory writes the modified cache line to main memory before replacing it. The comparator 124 compares the eviction counter 122 count to the value in the threshold register 128. When the comparator 124 determines the two values are equal indicating that the eviction count has reached the threshold, the comparator 124 notifies the state machine 126. In response, the state machine 126 resets the eviction counter 122 and selectively controls the power gates 134 to increase the number of ways 132 that are receiving power, as described in more detail below.

The control module 108 can be implemented in hardware, software or a combination thereof. In one embodiment, the portion of the control module 108 that puts the cores 102 to sleep comprises the microcode 138 running on each of the cores 102. The operation of the control module 108 is described in more detail below.

Figure 2:
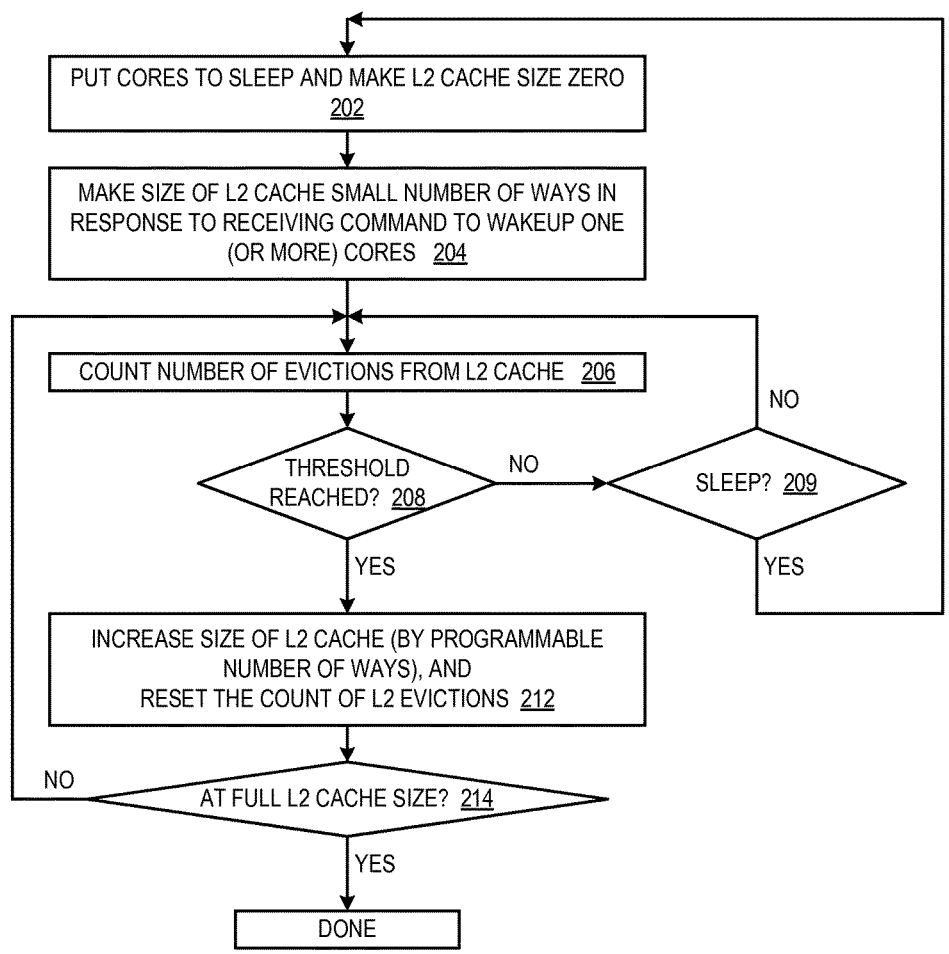
FIG. 2 is a flowchart illustrating operation of the microprocessor of FIG. 1 according to one embodiment.

Referring now to FIG. 2, a flowchart illustrating operation of the microprocessor 100 of FIG. 1 according to one embodiment is shown. Flow begins at block 202.

Prior to block 202 (and to block 402 of FIG. 4), the size of the L2 cache 106 may grow as the workload on the microprocessor 100 increases and shrink as the workload decreases. The size may also be affected by the configuration of the system in which the microprocessor 100 resides. For example, if the system is running on battery power, the power management policy may tend toward power savings, in which the case the operating system and/or microprocessor 100 may attempt to reduce the size of the L2 cache 106 relatively frequently; whereas, if the system is running on a sustained power source (e.g., A/C wall outlet), the power management policy may tend toward optimizing performance, in which the case the operating system and/or microprocessor 100 may attempt to reduce the size of the L2 cache 106 relatively infrequently. The operating system may request the microprocessor 100 to enter sleep states (e.g., C-states) in order to save power, in response to which the microprocessor 100 may reduce the size of the L2 cache 106, preferably in a piece-wise fashion. Additionally, the microprocessor 100 itself may monitor its workload and decide to reduce the size of the L2 cache 106 if the workload is low. In one embodiment, the microprocessor 100 reduces the size of the L2 cache 106 only if all of the cores 102 are sleeping in a minimum C-state and the current operating frequency is below a threshold. Preferably, the minimum C-state and threshold are programmable and the decreasing of the L2 cache 106 size is performed by the microcode 138.

At block 202, all the cores 102 are put to sleep and the size of the L2 cache 106 is made zero. This constitutes a very low power-consuming state of the microprocessor 100. In one embodiment, this corresponds to a processor C-state referred to as C5. As described above, making the size of the L2 cache 106 zero means removing power from all its ways 132. Putting a core 102 to sleep means causing the core 102 to cease executing instructions. Preferably, putting a core 102 to sleep also includes stopping clocks of the core 102. In one embodiment, putting a core 102 to sleep also includes removing power from portions, or all, of the core 102. Prior to putting the core 102 to sleep, the L1 cache 104 is flushed. The cores 102 may be put to sleep and the L2 cache 106 size made zero in response to various events, such as being instructed to do so by the operating system or the microprocessor 100 itself detecting that the workload is very small. Preferably, the microprocessor 100 also informs the memory controller of the system, which may reside in a chipset or in the microprocessor 100 itself, for example, that it need not snoop the caches of the microprocessor 100 because all their data is invalid. Not snooping the caches may result in a significant power savings because it may allow the microprocessor 100 to longer remain in a state in which significant portions of the microprocessor 100 have power removed, including the cache memories. Flow proceeds to block 204.

At block 204, the microprocessor 100 is commanded to wake up one or more of the cores 102 and, in response, increases the size of the L2 cache 106 from zero to non-zero. That is, the control module 108 powers up one or more of the ways 132 of the L2 cache 106. In one embodiment, the control module 108 powers up two ways 132. In one embodiment, the L2 cache 106 and the L1 caches 104 are inclusive, which requires the size of the L2 cache 106 to be non-zero if the size of the L1 cache 104 of any of the cores 102 is non-zero. Flow proceeds to block 206.

At block 206, the control module 108 begins to count the number of cache line evictions from the L2 cache 106. The number of evictions counted is the number since the size of the L2 cache 106 was made non-zero if flow proceeded to block 206 from block 204, whereas the number of evictions counted is the number since the size of the L2 cache 106 was increased at block 212 if flow proceed to block 206 from decision block 214. Flow proceeds to decision block 208.

At decision block 208, the control module 108 determines whether the number of evictions counted by the eviction counter 122 has reached the predetermined number stored in the programmable threshold register 128. If so, flow proceeds to block 212; otherwise, flow proceeds to decision block 209. In one embodiment, the predetermined number of evictions is one (1). In other embodiments, the predetermined number of evictions is greater than one. The predetermined number of evictions may be tuned in order to achieve a desired balance between performance (cache hit ratio) and power savings (amount powered on) affected by the size of the cache memory. Preferably, the predetermined number of evictions is programmable to enable the manufacturer to accomplish the desired tuning at manufacturing time and/or to enable system software to accomplish the desired tuning at run time. In one embodiment, the predetermined number of evictions is programmable via a write to a model specific register of the microprocessor 100, e.g., via an x86 WRMSR instruction.

At decision block 209, the microprocessor 100 determines whether it should, for reasons similar to those discussed above at block 202, return to a state in which all the cores 102 are put to sleep and the size of the L2 cache 106 is made zero. If so, flow proceeds to block 202; otherwise, flow returns to block 206.

At block 212, the control module 108 increases the size of the L2 cache 106 and resets the eviction counter 122. Preferably, the control module 108 increases the size of the L2 cache 106 by a predetermined number of ways 132, such as by two ways. However, preferably, the predetermined number of ways 132 is programmable, such as by the operating system and/or manufacturer of the microprocessor 100. Flow proceeds to decision block 214

At decision block 214, the control module 108 determines whether the L2 cache 106 has reached its full size, i.e., all the ways 132 are powered up. If so, flow ends and the control module 108 stops counting evictions and checking to see whether it needs to increase the size of the L2 cache 106; otherwise, flow returns to block 206.

The approach to dynamically increasing the size of the L2 cache 106 described above may be advantageous because when the microprocessor 100 wakes up it does not know what its workload will be. On the one hand, the microprocessor 100 may have been awakened simply to service and interrupt and then be put back to sleep, in which case it may be wasteful to increase the size of the L2 cache 106 to a large size. On the other hand, the microprocessor 100 may have been awakened to perform a large amount of work for a long time, in which case it may be desirable to increase the size of the L2 cache 106 to its full size. The embodiments described herein advantageously dynamically determine the needed size based on the number of evictions from the L2 cache 106.

Figure 3:
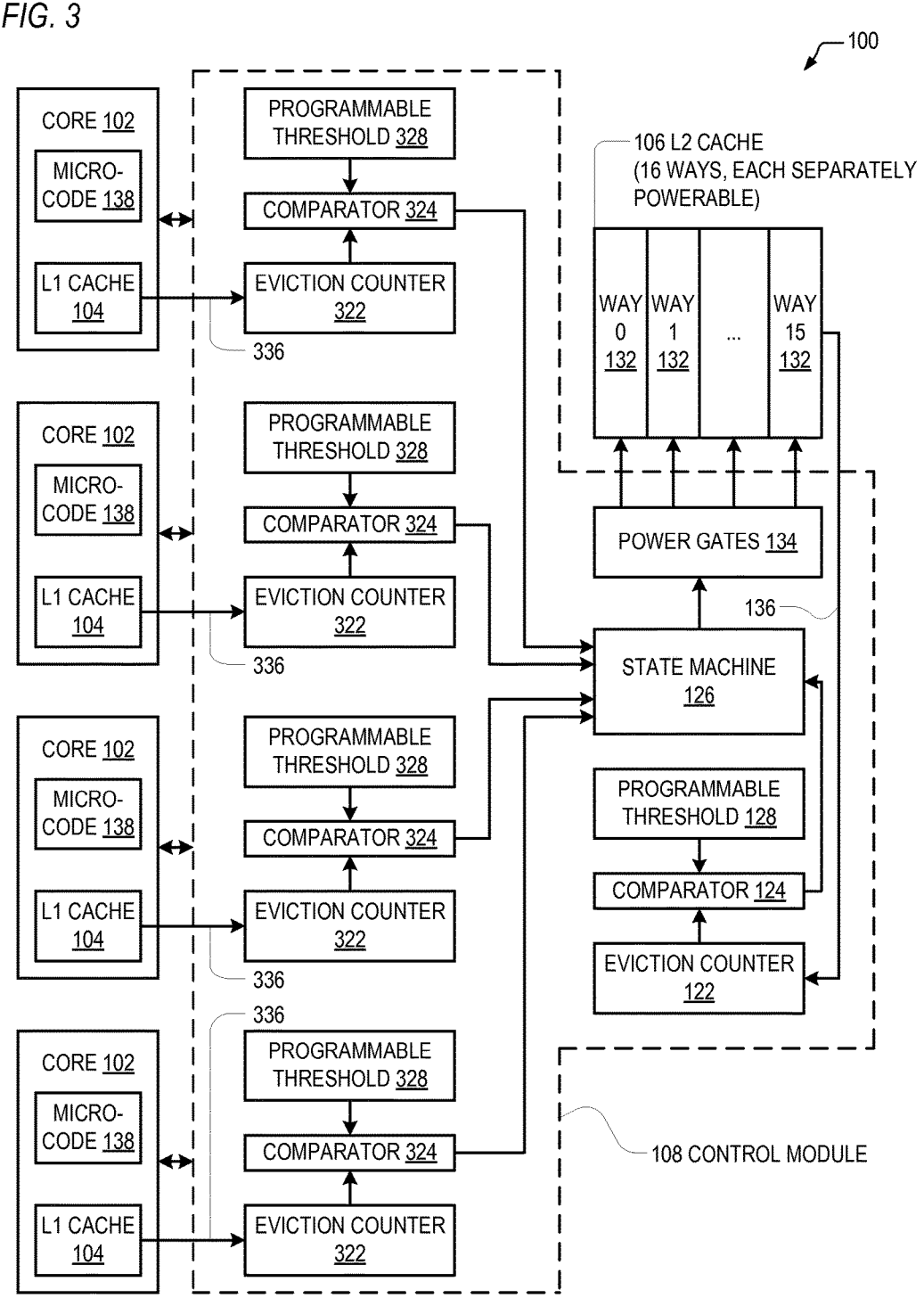
FIG. 3 is a block diagram of an alternate embodiment of a microprocessor.

Referring now to FIG. 3, a block diagram of an alternate embodiment of a microprocessor 100 is shown. The microprocessor 100 of FIG. 3 is similar in many respects to the microprocessor 100 of FIG. 1. However, the control module 108 of the microprocessor 100 of FIG. 3 also includes, for each associated core 102, a programmable threshold register 328 and an eviction counter 322 both coupled to a comparator 324 that provides an output to the state machine 126. Additionally, the state machine 126 of FIG. 3 is modified to receive the outputs of the comparators 324 and to control the power gates 134 in response to the comparator 324 outputs as well as the comparator 124 output. The eviction counter 322 receives an indication 336 from the L1 cache 104 of the associated core 102 when it evicts a cache line, which causes the eviction counter 322 to count the number of cache line evictions from the L1 cache 104. Each comparator 324 compares the eviction counter 322 count to the value in the threshold register 328. When the comparator 324 determines the two values are equal indicating that the eviction count has reached the threshold, the comparator 324 notifies the state machine 126. In response, the state machine 126 resets the eviction counter 322 and selectively controls the power gates 134 to make the number of ways 132 that are receiving power non-zero, as described in more detail below.

In one embodiment, the L2 cache 106 and the L1 caches 104 are non-inclusive, which enables the size of the L2 cache 106 to remain zero even if the size of the L1 cache 104 of any of the cores 102 is non-zero.

Figure 4:
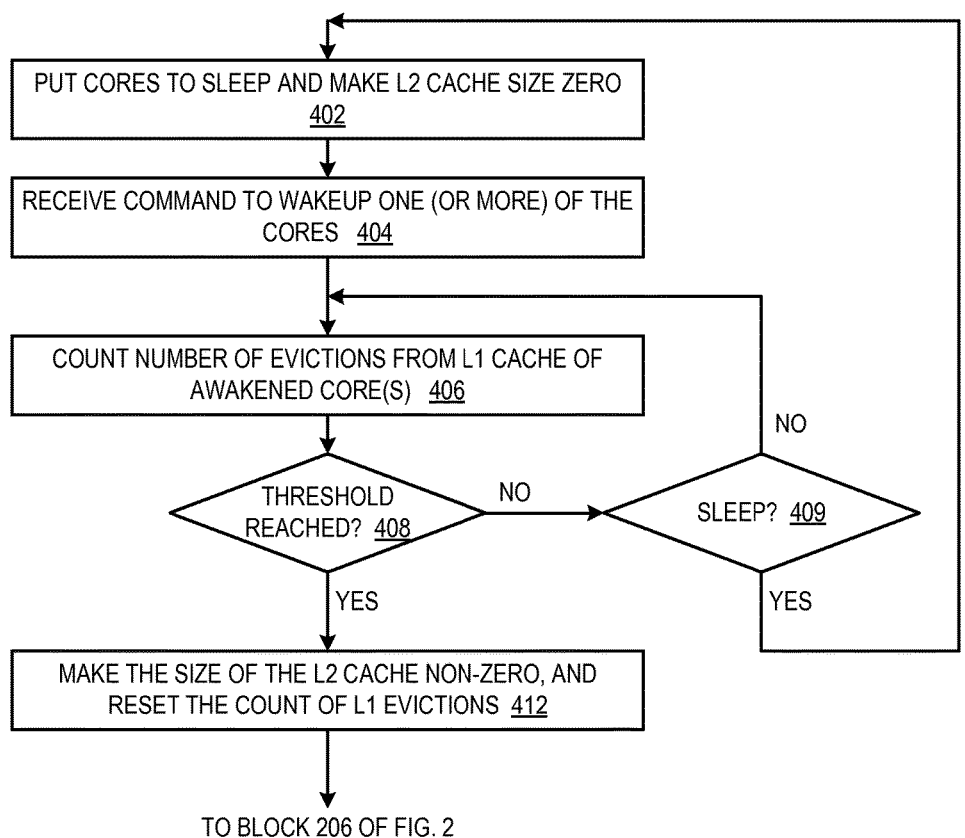
FIG. 4 is a flowchart illustrating operation of the microprocessor of FIG. 3 according to one embodiment.

Referring now to FIG. 4, a flowchart illustrating operation of the microprocessor 100 of FIG. 3 according to one embodiment is shown. Flow begins at block 402.

At block 402, all the cores 102 are put to sleep and the size of the L2 cache 106 is made zero, similar to the manner described above with respect to block 202. Flow proceeds to block 404.

At block 404, the microprocessor 100 is commanded to wake up one or more of the cores 102. Flow proceeds to block 406.

At block 406, the control module 108 begins to count the number of cache line evictions from the L1 cache 106 of the awakened cores 102. The number of evictions counted is the number counted since one or more of the cores 102 was awakened at block 404 and began utilizing its L1 cache 104. Flow proceeds to decision block 408.

At decision block 408, the control module 108 determines whether the number of evictions counted by any of the eviction counters 322 has reached the predetermined number stored in the programmable threshold register 328. If so, flow proceeds to block 412; otherwise, flow proceeds to decision block 409. In one embodiment, the predetermined number of evictions is one (1). In other embodiments, the predetermined number of evictions is greater than one. The predetermined number of evictions may be tuned in order to achieve a desired balance between performance (cache hit ratio) and power savings (amount powered on) affected by the size of the cache memory as described above.

At decision block 409, the microprocessor 100 determines whether it should, for reasons similar to those discussed above at block 202, return to a state in which all the cores 102 are put to sleep and the size of the L2 cache 106 is made zero. If so, flow proceeds to block 402; otherwise, flow returns to block 406.

At block 412, the control module 108 makes the size of the L2 cache 106 non-zero and resets the eviction counters 322. In an alternate embodiment, the control module 108 resets only the eviction counter 322 whose count reached the predetermined number stored in the threshold register 328. Preferably, the control module 108 makes the size of the L2 cache 106 a predetermined number of ways 132, such as two ways 132. However, preferably, the predetermined number of ways 132 is programmable, such as by the operating system and/or manufacturer of the microprocessor 100. Flow proceeds from block 412 to block 206 of FIG. 2.

The approach to dynamically increasing the size of the L2 cache 106 described above may be advantageous because when the microprocessor 100 wakes up it does not know what its workload will be, as described above. The embodiments described herein advantageously dynamically determine the needed size based on the number of evictions from the L1 cache 104, and subsequently based on evictions from the L2 cache 106.

Although embodiments have been described in which the cache memory whose size is being increased in an L2 cache, other embodiments are contemplated in which the size of cache memories at other levels in the cache memory hierarchy of the microprocessor are being dynamically increased, such as, but not limited to, level-1, level-3 or level-4 caches. For example, the embodiments related to FIGS. 1 and 2 may be employed with cache memories at any level. Furthermore, the embodiments related to FIGS. 3 and 4 may be employed with cache memories at any but the lowest level.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor, comprising:
a plurality of processing cores, wherein each processing core comprises a first cache memory;
a second cache memory shared by the plurality of processing cores; and
a control module, configured to:
make a size of the second cache memory zero;
subsequently increase the size of the second cache memory to a first non-zero size that is less than a full potential size of the second cache memory;
subsequently conditionally increase the size of the second cache memory after a number of evictions from the first cache memory of the one of the processing cores reaches a predetermined number to incrementally larger sizes, but not beyond the full potential size of the second cache memory;
count a number of evictions from the second cache memory after each increase in the size of the second cache memory;
wherein each subsequently conditional increase in the size of the second cache memory is triggered when the control module determines that a single count has reached a threshold, where the count is the number of evictions since the last increase of the second cache memory's size, and the threshold is a second predetermined number of evictions; and
reset, after each time the size of the second cache memory is increased, the number of counted evictions to zero,
wherein the control module further determines whether the plurality of processing cores comprised in the microprocessor should be put to sleep and the size of the second cache memory should be made zero when the control module determines that the single count has not reached the threshold; and
the control module puts the plurality of processing cores to sleep and makes the size of the second cache memory zero when the control module determines that the plurality of processing cores comprised in the microprocessor should be put to sleep and the size of the second cache memory should be made zero.

2. The microprocessor of claim 1, wherein the predetermined number of evictions is programmable.

3. The microprocessor of claim 1, wherein the cache memory comprises a set-associative memory having N ways, wherein the size of the cache memory is determined by a number of the N ways to which power is provided to make them available for use by the microprocessor, wherein the control module is configured to increase the size of the cache memory by increasing the number of the N ways to which power is provided.

4. The microprocessor of claim 3, wherein to increase the number of the N ways to which power is provided the control module is configured to increase the number of the N ways by a programmable number of ways.

5. A method for managing performance and power consumption by a microprocessor having a plurality of processing cores, wherein each processing core comprises a first cache memory, and a second cache memory shared by the plurality of processing cores capable of having its size dynamically varied during operation of the microprocessor, the method comprising:
initially set a size of the second cache memory to zero;
subsequently conditionally adjust the size of the second cache memory after a number of evictions from the first cache memory of the one of the processing cores reaches a predetermined number to incrementally larger sizes between zero and a full size of the second cache memory;
count a number of evictions from the second cache memory after each adjustment of the size of the second cache memory; and
reset, after each time the size of the second cache memory is increased, the number of counted evictions to zero,
wherein the method further comprises:
each subsequently conditional in the size of the second cache memory is triggered when determining that the number of evictions has reached a second predetermined number of evictions;
determine whether the plurality of processing cores should be put to sleep and the size of the second cache memory should be made zero when determining that the count has not reached the second predetermined number of evictions; and
put the plurality of processing cores to sleep and makes the size of the second cache memory zero when determining that the plurality of processing cores comprised in the microprocessor should be put to sleep and the size of the second cache memory should be made zero.

6. The method of claim 5, wherein the predetermined number of evictions is programmable.

7. The method of claim 5, wherein the cache memory comprises a set-associative memory having N ways, wherein the size of the cache memory is determined by a number of the N ways to which power is provided to make them available for use by the microprocessor, wherein said increasing the size of the cache memory comprises increasing the number of the N ways to which power is provided.

8. The method of claim 7, wherein said increasing the number of the N ways to which power is provided comprises increasing the number of the N ways by a programmable number of ways.

9. A microprocessor, comprising:
a plurality of processing cores, each comprising a first cache memory;
a second cache memory, shared by the plurality of processing cores; and
a control module, configured to:
put all the plurality of processing cores to sleep and make a size of the second cache memory zero;
receive a command to wake up one of the cores;
count a number of evictions from the first cache memory of the one of the cores, after receiving the command;
make the size of the second cache memory non-zero when the number of evictions reaches a predetermined number of evictions; and
reset, after the size of the second cache memory is made non-zero, the number of counted evictions from the first cache memory of the one of the cores to zero.

10. The microprocessor of claim 9, wherein the predetermined number of evictions is one.

11. The microprocessor of claim 9, wherein the predetermined number of evictions is programmable.

12. The microprocessor of claim 9, wherein the second cache memory and the first cache memories are non-inclusive.

13. The microprocessor of claim 9, wherein the control module is further configured to:

count a number of evictions from the second cache memory, after making the size of the second cache memory non-zero; and increase the size of the second cache memory when the number of evictions from the second cache memory reaches a second predetermined number of evictions.

14. A method for managing the performance and power consumption of a microprocessor having a plurality of processing cores each having a first cache memory, the microprocessor also having a second cache memory shared by the plurality of processing cores, the method comprising:

putting all the plurality of processing cores to sleep and making a size of the second cache memory zero;

receiving a command to wake up one of the cores;

counting a number of evictions from the first cache memory of the one of the cores, after said receiving the command;

making the size of the second cache memory non-zero when the number of evictions reaches a predetermined number of evictions; and resetting, after the size of the second cache memory is made non-zero, the number of counted evictions from the first cache memory of the one of the cores to zero.

15. The method of claim 14, wherein the predetermined number of evictions is one.

16. The method of claim 14, wherein the predetermined number of evictions is programmable.

17. The method of claim 14, wherein the second cache memory and the first cache memories are non-inclusive.

18. The method of claim 14, further comprising:

counting a number of evictions from the second cache memory, after said making the size of the second cache memory non-zero; and increasing the size of the second cache memory when the number of evictions from the second cache memory reaches a second predetermined number of evictions.

* * * * *